United States Patent Office.

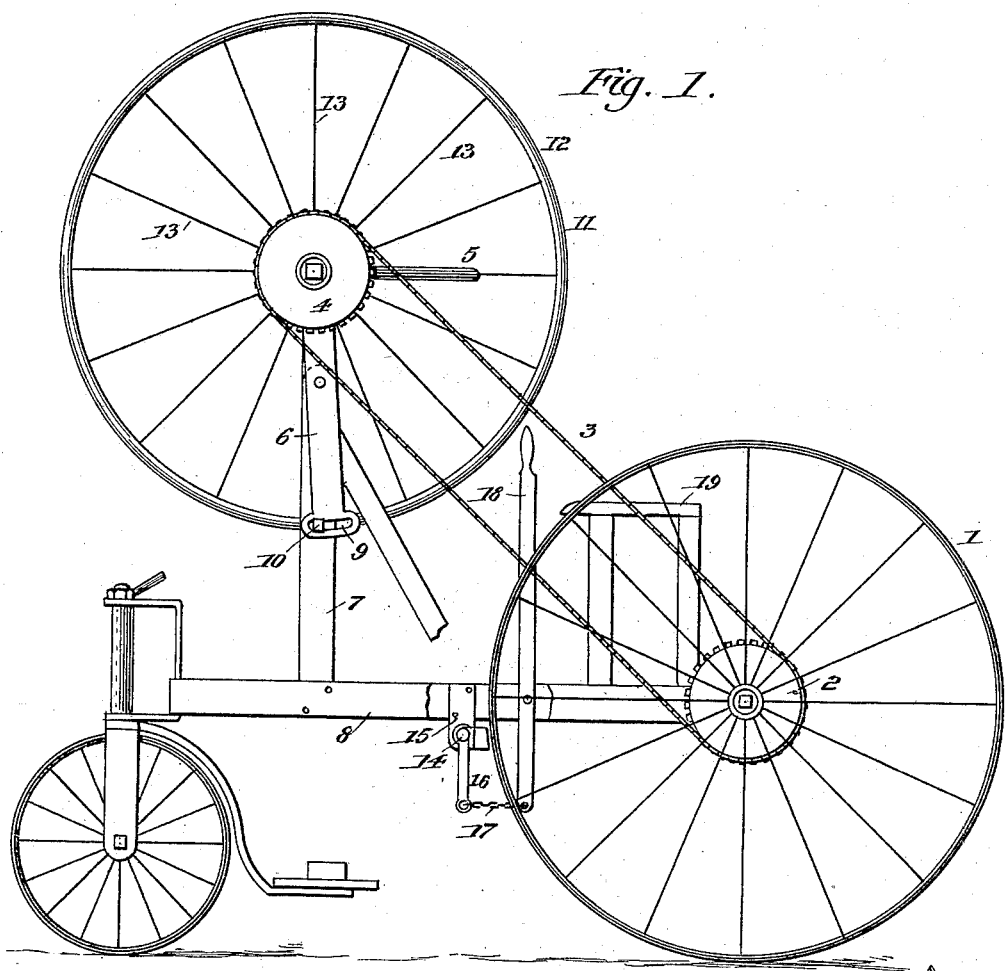

PATRICK GALLAGHER, OF NEW YORK, N. Y.

TRICYCLE.

SPECIFICATION forming part of Letters Patent No. 397,638, dated February 12, 1889.

Application filed August 24, 1888. Serial No. 283,622. (No model.)

*To all whom it may concern:*

Be it known that I, PATRICK GALLAGHER, of the city, county, and State of New York, have invented a new and useful Improvement in Tricycles, of which the following is a full, clear, and exact description.

This invention is designed as an improvement upon the tricycle for which Letters Patent No. 388,963 were granted to me on September 4, 1888, and which included a special combination, with the driving-wheel and its axle, a chain-wheel mounted on the latter, and uprights forming part of the machine-frame, of arms pivoted to said uprights and having slots in their lower ends, adjusting-bolts passing through said slots, a crank-handle mounted in the upper ends of said arms, a chain-wheel on the axle of said crank-handle, and an endless chain connecting the two chain-wheels, whereby the adjustment of the arms regulates the tension of the endless chain, and the position of the crank-handle may also be adjusted with reference to the vehicle-seat, said handle being conveniently in reach of a person occupying the seat.

The object of the present invention is to provide for making such tricycle run easier and under better control, and to this end I resort to the well-known expedients of a fly-wheel applied to the driving mechanism and a brake capable of application to the driving-wheels, and to do this effectually I so combine and arrange the brake-operating lever, the rider's seat, and the crank-handle that the occupant of the seat can readily, when not using both hands on the crank-handle, apply his one hand to the latter and his other hand to the brake-lever to regulate the speed as required—as, for instance, when going down hill—and thereby have the most perfect control over the machine without changing his position on the seat, substantially as hereinafter described, and pointed out in the claim.

Reference is to be had to the accompanying drawings, forming a part of this specification, in which similar figures of reference indicate corresponding parts in all the figures.

Figure 1 is a side view of a tricycle similar to that described in my Letters Patent hereinbefore referred to with my improvement applied. Fig. 2 is a detail thereof, and Fig. 3 is a view showing the brake mechanism detached.

In the drawings, 1 indicates the driving-wheels of the tricycle; 2, the chain-wheel on the axle of said wheel; 3, the endless chain connecting said chain-wheel with a chain-wheel, 4, on the axle of the crank-handle 5. 6 indicates the arms in the upper ends of which the crank-handle turns; 7, the uprights on the frame 8, to which said arms are pivoted; 9, the slot in the lower ends of said arms, and 10 the adjusting-bolt passing through said slot and engaging with the upright 7, all substantially as described in my Letters Patent hereinbefore referred to. This gearing provides for driving the tricycle by operating the crank-handle 5; and to facilitate the operation of the machine, to make it run easier, and to maintain speed, I mount, not upon a secondary shaft but directly on the axle of the crank-handle, a fly-wheel, 11, which is preferably constructed with a large rim, 12, provided with light-wire spokes and weighted. After said fly-wheel has obtained a high degree of momentum but little exertion will be required to operate the crank-handle 5.

To brake the tricycle the following mechanism is employed: A shaft, 14, is mounted in hangers 15, secured to the frame 8 in front of the wheels 1, and is operated by means of a depending arm, 16, connected by a chain, 17, to the lower end of a hand-lever, 18, pivoted to frame 8 and projecting upward adjacent to the seat 19, and so that it may be easily manipulated from one side of the latter by the occupant thereof, who faces the crank-handle 5. To the ends of the shaft 14 are secured metallic pieces 20, having inwardly-bent and downwardly-tapering ends 21, which engage the tapering blocks 22, slid in between the bent tapering ends 21 from the top, the faces 23 of said blocks 22 preferably being of rubber, and being inclined and curved, as shown, to fit against the wheels 1. About such special construction of the details of the brake and brake mechanism nothing, however, is here claimed, and the same might be changed so long as the hand-lever of the brake, the seat of the vehicle, and the crank-handle, with its attached fly-wheel, occupy like relations with each other.

When applying the brake the hand-lever 18 is pushed forward, which causes the chain 17 to draw the arm 16 backward and rotate the shaft 14, thereby turning the blocks 22 up against the wheels 1.

By the arrangement of the fly-wheel 11 on the axle of the crank-handle 5 the adjustment of the pivoted arms 6, which carry the latter, to regulate the tension of the endless chain 3, not only retains the fly-wheel in its proper relation with the crank-handle during the different adjustment, but secures a more direct action, free from jerks, where the effect of the momentum of said wheel is most needed, than if the fly-wheel were separately arranged and geared with the operating-shaft, and the tricycle, after being once fairly started, may be run with great ease and smoothness. In addition to this, the relative arrangement of the rider's seat with the crank-handle and the hand-lever 18 of the brake provides for the occupant of the seat either using both of his hands to work the crank-handle, or when the fly-wheel has acquired a high degree of momentum—as in running downhill, for instance—to keep only one of his hands on the crank-handle and his other hand on the brake-lever, and so to regulate the speed with the greatest nicety and without changing his position on the seat.

Having thus described my invention, what I claim as new, and desire to secure by Letters Patent, is—

In a tricycle constructed with a crank-handle arranged in front of and above the level of the seat of the vehicle, and having its bearings in adjustable arms pivoted to uprights on the frame of the machine, and an endless chain connecting a chain-wheel on the crank-handle shaft with a similar wheel on the driving-wheel shaft, the combination, with the pivoted adjustable arm 6 and the crank-handle 5, having its bearing therein, of a fly-wheel, 11, on the shaft of said adjustable crank-handle, the vehicle-seat 19, the driving-wheels 1, a brake adapted to bear on said driving-wheels, and a hand-lever, 18, operating said brake and arranged for manipulation from one side of the seat and in front of the latter and out of line with the operating crank-handle, substantially as shown and described, and for the purposes herein set forth.

PATRICK GALLAGHER.

Witnesses:
EDWARD W. CODY,
C. SEDGWICK.